(No Model.)

R. H. ISBELL.
BUTTON.

No. 278,556. Patented May 29, 1883.

WITNESSES:
W. P. Robertson
Edwin Hilton Bond

INVENTOR
Robert H. Isbell
BY T. W. Robertson
ATTORNEY.

UNITED STATES PATENT OFFICE.

ROBERT H. ISBELL, OF NEW YORK, N. Y.

BUTTON.

SPECIFICATION forming part of Letters Patent No. 278,556, dated May 29, 1883.

Application filed April 10, 1883. (No model.)

*To all whom it may concern:*

Be it known that I, ROBERT H. ISBELL, of the city of New York, in the county of New York and State of New York, have invented a new and useful Improvement in Buttons, of which the following is a specification.

My invention relates to the manufacture of buttons having a solid front or face of vegetable ivory, horn, wood, or other suitable substance, and provided with a back of canvas or other suitable material.

In order that my said invention may be more clearly and easily understood and more readily performed, I will give a full, clear, and exact description of the same, reference being had to the accompanying drawings, and to the letters of reference marked thereon, similar letters indicating similar parts, making a part of this specification, in which—

Figure 1:
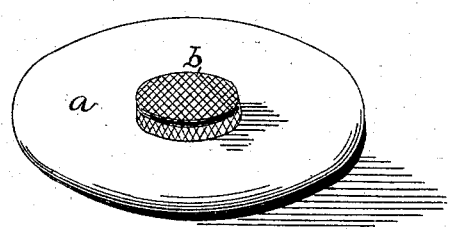
Figure 2:
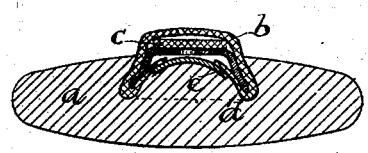
Figure 3:
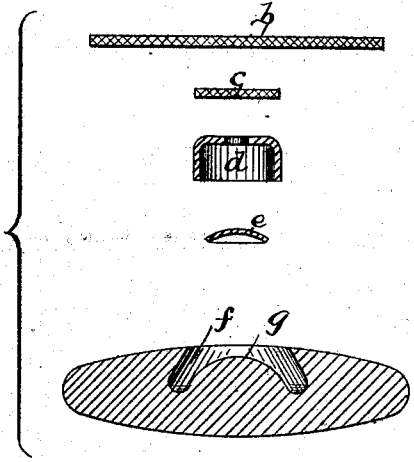

Figure 1 is a completed button. Fig. 2 is a vertical sectional view of said button. Fig. 3 shows the different parts of which my invention is composed.

The front or main portion, $a$, of the button is made of vegetable ivory, horn, wood, or other suitable substance, and has in its back a circular recess, $f$, the sides of which fall outward toward the bottom, forming a dovetail, as shown in Fig. 3. In the center of said recess is a cone, $g$, having a rounded top, which projects toward the mouth of the recess, or nearly so.

The second or back portion of the button consists of, first, a circular shell of metal, $d$, having a raised edge and an orifice centrally formed therein; second, a piece of wadding, $c$; and, third, a circular piece of canvas or other suitable flexible material, $b$. The wadding $c$ is placed upon the outside of the shell $d$, immediately over the orifice therein, and the canvas $b$ is then placed over them and its edge folded over the edge and against the inner side of the shell $d$. (See Fig. 2.) A metal disk, $e$, may be used to hold the edge of the canvas in position within the shell; but this is not essential. This second or back portion of the button is then placed within the recess $f$, immediately over the cone $g$, and upon a suitable pressure being applied said cone, acting as a wedge, forces outward the edge of the shell, so that it fits into the deepest part of the recess, and the said shell, and also the canvas which covers it, are thus firmly secured in said recess, between the dovetail sides thereof and the said cone. As the canvas $b$ is folded under the edge of the shell $d$, the said shell will be subjected to a severe strain whenever the canvas $b$ is pulled, and should the center of said shell be left unsupported the tendency would be to double the said shell at its center, and thus loosen the button-back. To prevent this the disk $e$, or, in a button made without said disk, the shell $d$, should rest upon the top of the cone $g$.

I am aware of Patents Nos. 229,196 and 232,190, and make no claim to the constructions shown therein.

I claim as my invention and desire to secure by Letters Patent—

A button with a solid front or face, having a recess, $f$, with a cone, $g$, therein, in combination with the canvas $b$, wadding $c$, and shell $d$, substantially as and for the purposes above described.

ROBERT H. ISBELL.

Witnesses:
  THOS. ALEXANDER, Jr.,
  JAMES A. PATRICK.